Jan. 30, 1968   G. H. HUGHES   3,365,918
SIMULATED NON-WOVEN CORDUROY FABRIC AND
METHOD OF FORMING THE SAME
Filed June 16, 1966   8 Sheets-Sheet 1
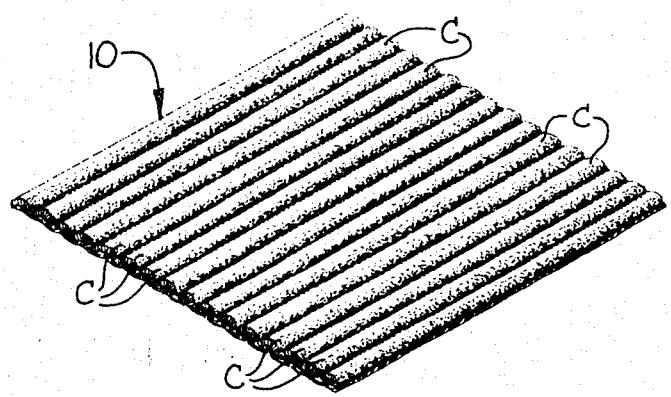
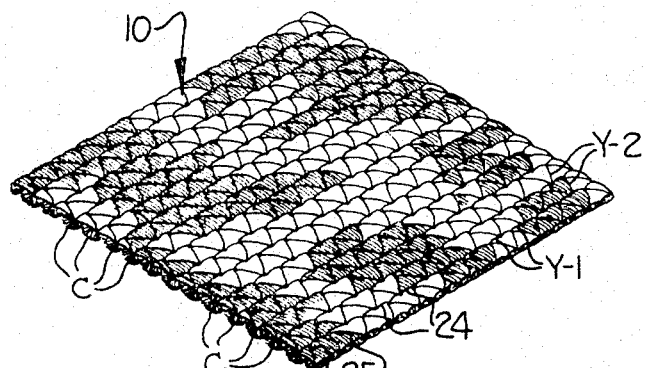
INVENTOR:
GEORGE H. HUGHES
BY Parrott, Bell, Seltzer, Park & Heard
ATTORNEYS Jan. 30, 1968          G. H. HUGHES            3,365,918
         SIMULATED NON-WOVEN CORDUROY FABRIC AND
                METHOD OF FORMING THE SAME
Filed June 16, 1966                        8 Sheets-Sheet 2

INVENTOR:
GEORGE H. HUGHES

BY Parrott, Bell, Seltzer, Park & Heard
ATTORNEYS

Jan. 30, 1968  G. H. HUGHES  3,365,918
SIMULATED NON-WOVEN CORDUROY FABRIC AND
METHOD OF FORMING THE SAME
Filed June 16, 1966  8 Sheets-Sheet 5
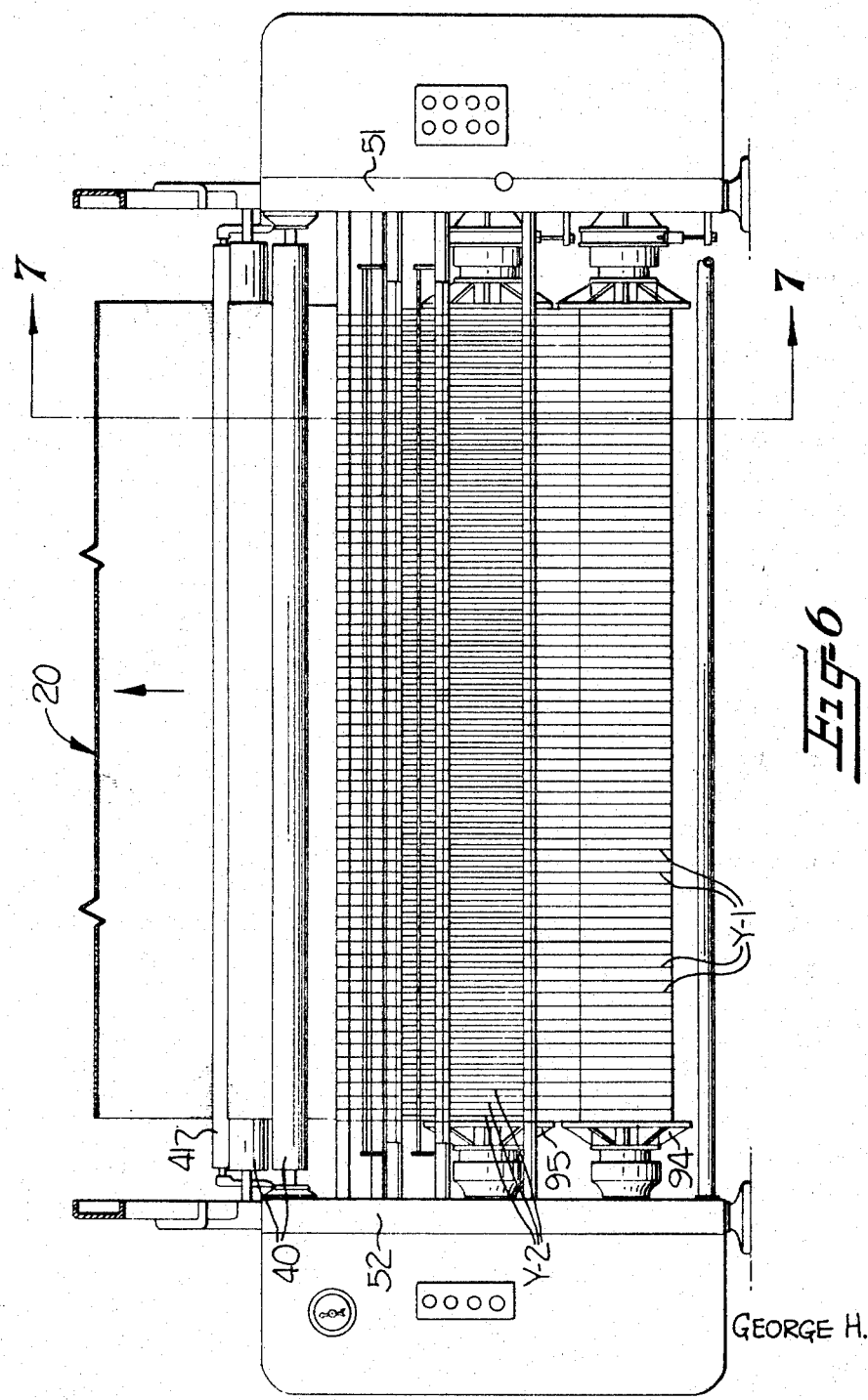
INVENTOR:
GEORGE H. HUGHES
BY Parrott, Bell, Seltzer, Park & Heard
ATTORNEYS Jan. 30, 1968    G. H. HUGHES    3,365,918
SIMULATED NON-WOVEN CORDUROY FABRIC AND
METHOD OF FORMING THE SAME
Filed June 16, 1966    8 Sheets-Sheet 4
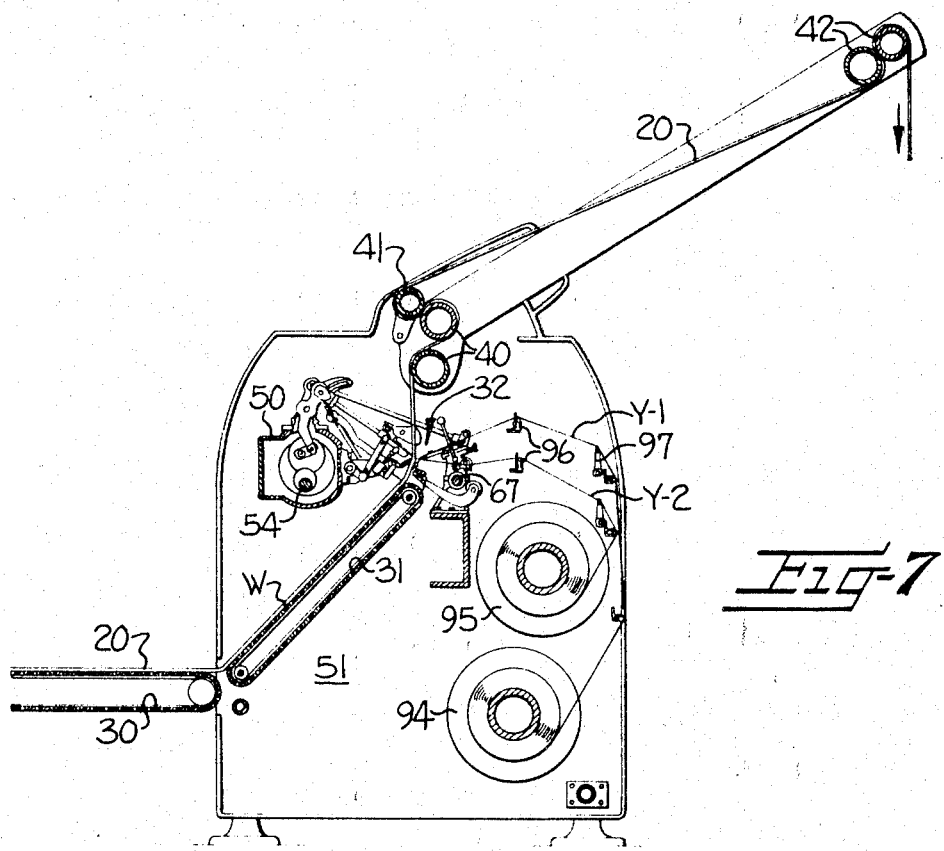
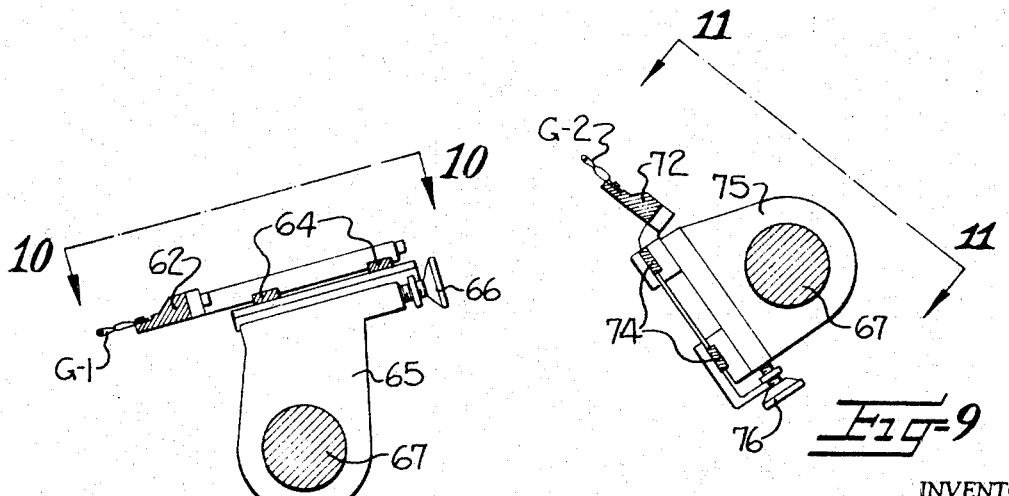
INVENTOR:
GEORGE H. HUGHES
BY Parrott, Bell, Seltzer, Park & Heard
ATTORNEYS

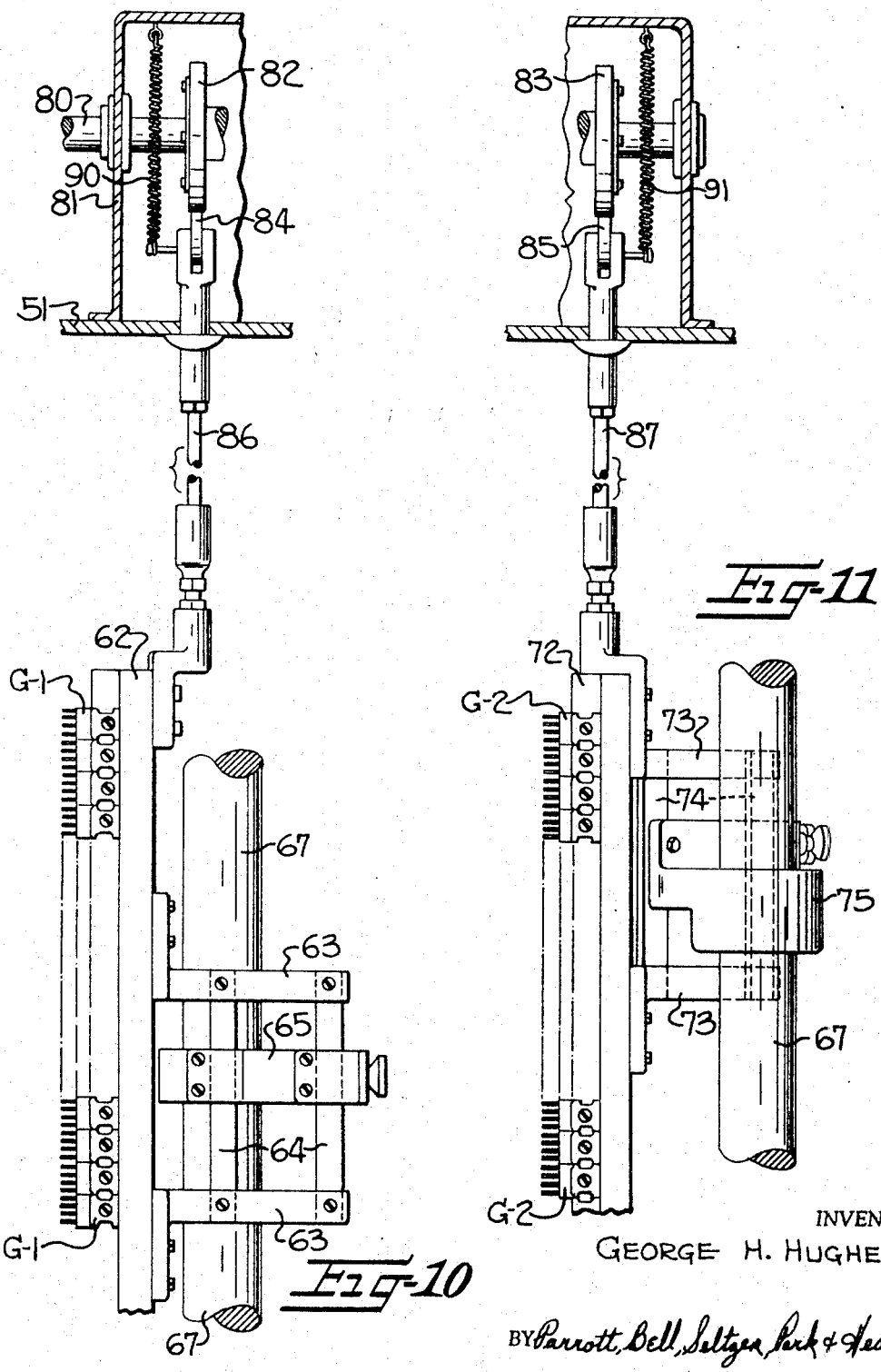

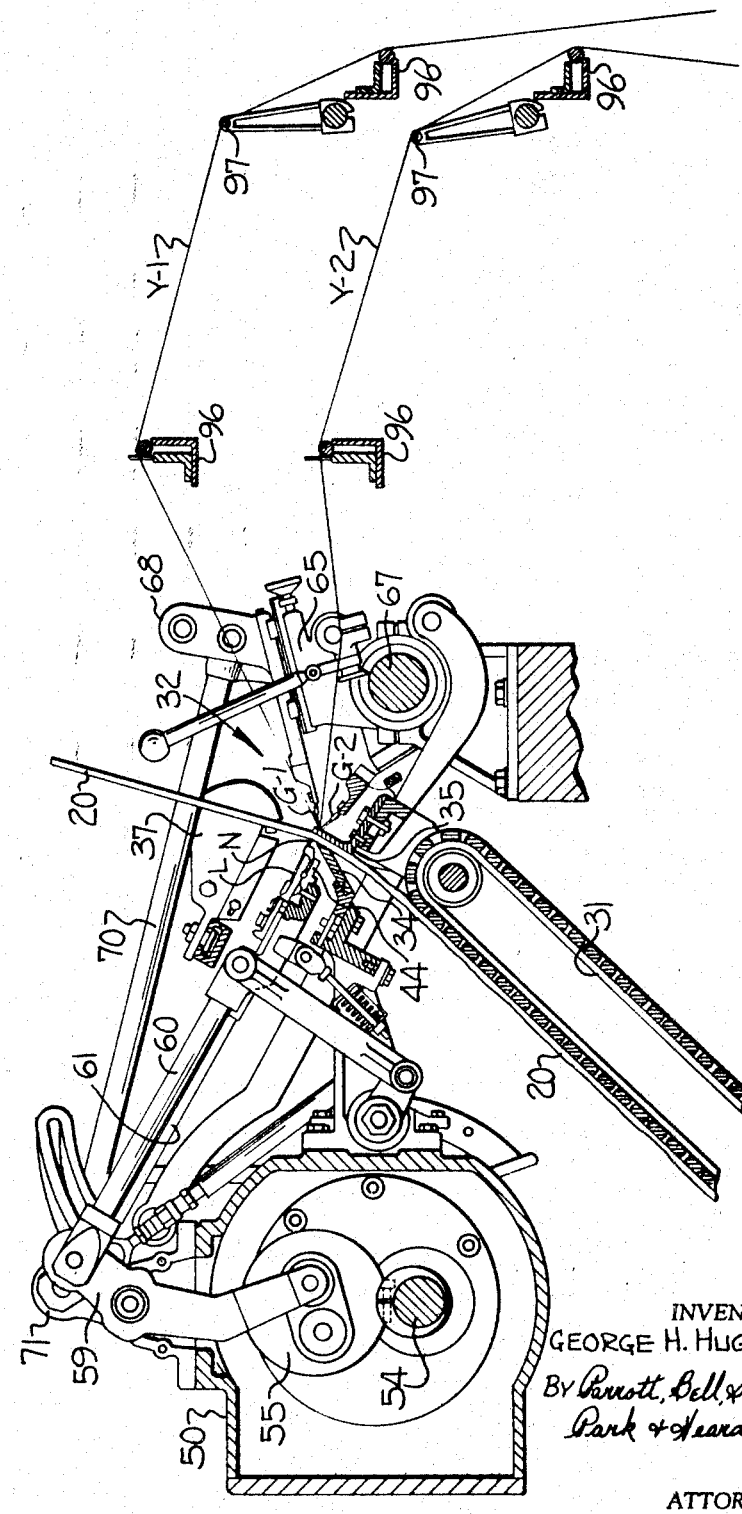

INVENTOR:
GEORGE H. HUGHES

Jan. 30, 1968  G. H. HUGHES  3,365,918
SIMULATED NON-WOVEN CORDUROY FABRIC AND
METHOD OF FORMING THE SAME
Filed June 16, 1966  8 Sheets-Sheet 8

INVENTOR:
GEORGE H. HUGHES

BY Parrott, Bell, Seltzer, Park & Heard
ATTORNEYS

United States Patent Office 3,365,918
Patented Jan. 30, 1968

3,365,918
SIMULATED NON-WOVEN CORDUROY FABRIC AND METHOD OF FORMING THE SAME
George H. Hughes, Granby, Quebec, Canada, assignor to Beacon Manufacturing Company, a corporation of Delaware
Continuation-in-part of application Ser. No. 477,440, Aug. 5, 1965. This application June 16, 1966, Ser. No. 559,057
2 Claims. (Cl. 66—192)

ABSTRACT OF THE DISCLOSURE

A non-woven simulated corduroy fabric and method of producing same formed from a self-sustaining batt of non-woven fibers extending generally in the widthwise direction of the fabric to provide strength and stability to the fabric in the widthwise direction. The fabric is formed with a special stitch construction utilizing two yarn ends in each stitch and being arranged in closely spaced apart parallel rows of chain stitch portions on the obverse side of the fabric and extending in generally the lengthwise direction of the fabric and arranged in interconnected diagonally extending and straight line stitch portions on the reverse side of the fabric for providing strength and stability to the fabric in both the lengthwise and widthwise directions. The rows of chain stitch portions on the obverse side of the fabric compress the non-woven batt along the rows to form corresponding parallel depressed areas therealong and the portions of the batt between the rows of stitches being substantially uncompressed and defining spaced, parallel ribs. The fibers of the batt forming the ribs have cut ends and are upstanding to provide a surface on the fabric having the appearance and feel simulating that of conventionally-woven corduroy fabric.

---

This is a continuation-in-part of my prior application Serial No. 477,440, filed August 5, 1965, and now abandoned.

Conventional corduroy fabric is normally woven in a special manner to produce initially parallel rows of floats extending in a fillingwise direction. These floats are then cut and the fabric finished to give the corduroy effect. "Corduroy" fabric is by definition and in actual practice produced from a woven material, and although non-woven materials have been used for different end products heretofore, they have not been produced in suitable base form or suitably processed for obtaining a satisfactory corduroy finish. Conventional non-woven materials, with or without chemical bonding, are not suited for making corduroy fabric because they do not have the necessary ribbed construction and cannot be processed to obtain the usual corduroy finish.

In accordance with the present invention, a simulated corduroy fabric having the desired construction and corduroy finish has been produced for the first time, from a non-woven material. This product has the economical advantage of not requiring a woven base fabric or any weaving operations whatsoever. Furthermore, in contrast to the usual non-woven materials, the non-woven base used in this invention is markedly strong and is adapted to be processed to provide the desired corduroy finish without damage to the non-woven base. This new result is obtained without the necessity of any chemical bonding.

The new product of the present invention is obtained with a non-woven batt of textile fibers by stitching through the batt with a special type of machine that produces a ribbed construction in the batt. This stitched batt contains closely spaced apart parallel rows of chain stitches that penetrate through the batt and form parallel spaced solid ribs of fibers between the rows of stitches on the obverse side of the batt. On the reverse side of the batt there are two sets of stitches, described below, that cofunction with the parallel rows of stitches on the obverse side to impart great strength to the stitched non-woven batt such that it may be rigidly processed to provide a desired corduroy-type finish without damage to the batt.

In a typical embodiment, the non-woven fibrous batt is stitched with the above-mentioned special machine so as to form spaced parallel rows of double yarn chain stitches on the obverse side while forming on the reverse side diagonally extending stitch portions of one of the yarns that interconnect the parallel chains and while forming straight line stitch portions of the other yarn. This stitching operation causes raised parallel ribs of uncompressed fibers of the fibrous batt to be formed on the obverse side of the fibrous batt and between the parallel rows of double yarn chain stitches. Thereafter, the uncompressed fibers of the ribs on the obverse side are processed to produce a soft corded surface effect simulating that of conventional woven corduroy fabric.

The processing of the stitched non-woven batt to provide the corduroy-type finish may be effected by first cutting the fibers along the raised parallel ribs, then brushing the cut fibers to cause them to stand up and finally shearing the ends of the cut and brushed fibers in the parallel rows to give a soft, napped, surface effect simulating the rows or ribs of conventional woven corduroy. This processing operation comprising the steps of cutting, brushing and shearing may be carried out conjointly with the stitching operation and in coordinated sequential steps.

The stitching of the non-woven fibrous batt may be carried out by feeding the batt through a machine having a set of reciprocating needles which penetrate through the non-woven batt. The machine also includes two sets of yarn guides for supplying corresponding first and second sets of yarn ends to the needles with each penetration of the non-woven batt by the needles. Preferably, the machine also includes means for operating the two sets of yarn guides so that one set of yarn ends is continuously fed to the same needles with each penetration of the non-woven batt while the other set of yarn guides is "shogged" between adjacent needles following each penetration of the non-woven batt by the needles to form diagonally extending cross-linking portions on the reverse side of the non-woven batt.

Other features of the present invention will be understood from the following more detailed description taken in conjunction with the accompanying drawings in which—

FIGURE 1 is an isometric view of the obverse side of the simulated non-woven corduroy fabric of the present invention;

FIGURE 2 is a view similar to FIGURE 1 but showing the reverse side of the fabric;

FIGURE 6 is a front elevation of a suitable type of stitching machine with which the non-woven fibrous batt is initially stitched together;

FIGURE 7 is a vertical sectional view taken substantially along the line 7—7 in FIGURE 6;

FIGURE 8 is an enlarged sectional view of the upper yarn guide and showing the support means therefor;

FIGURE 9 is an enlarged sectional view of the lower yarn guide and showing the support means therefor;

FIGURE 10 is a fragmentary plan view looking down on the upper yarn guide shown in FIGURE 8, being taken substantially along line 10—10, and also illustrating the cam means for moving the yarn guides transversely of the needles;

FIGURE 11 is a fragmentary plan view of the lower yarn guides and illustrating the cam means for moving the yarn guides transversely of the needles, being taken looking along the line 11—11 in FIGURE 9;

FIGURE 12 is an enlarged vertical sectional view of the central portion of FIGURE 7, showing the relationship of the needles and the yarn guides to the non-woven batt as the stitches are formed therethrough;

Figure 13:
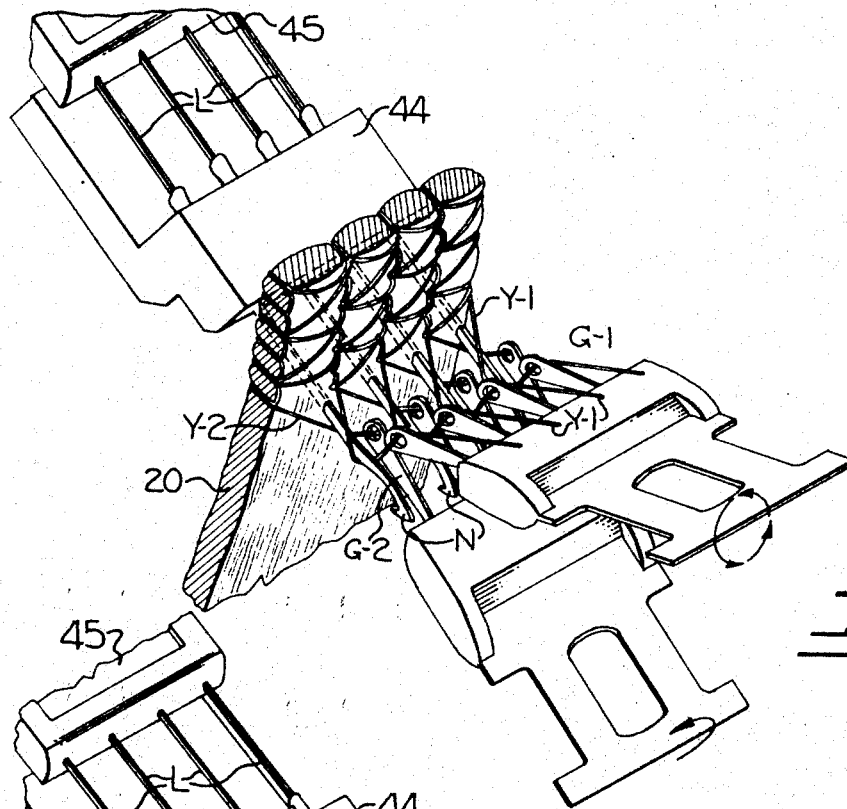
Figure 14:
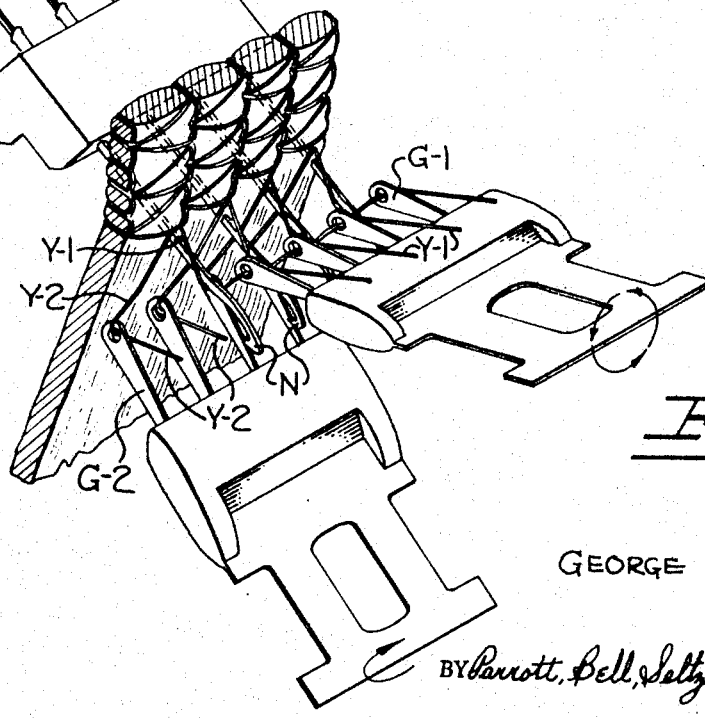
Figure 15:
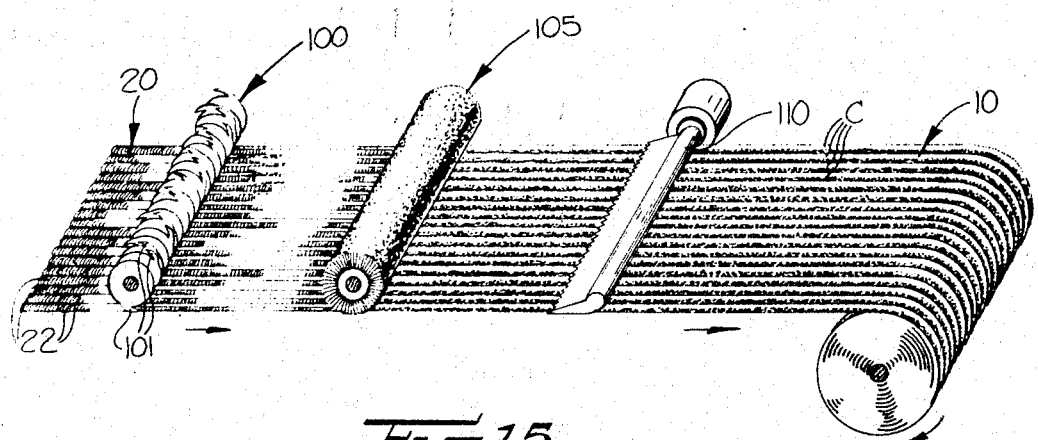

FIGURES 13 and 14 are somewhat schematic fragmentary views of the upper and lower yarn guides and illustrating the manner in which they operate to feed the yarn to the needles as they penetrate the non-woven fibrous batt; and FIGURE 15 is a schematic view of the equipment for processing the stitched non-woven fibrous batt to form the simulated corduroy fabric, and showing the fabric passing through the equipment.

The obverse and reverse sides of the simulated non-woven corduroy fabric, generally referred to at 10 and constructed according to this invention, are shown in FIGURES 1 and 2, respectively. This simulated non-woven corduroy fabric 10 is formed initially, as shown in FIGURES 3 and 4, from a stitched non-woven batt 20 which is subsequently processed to form the simulated corduroy fabric.

Figure 3:
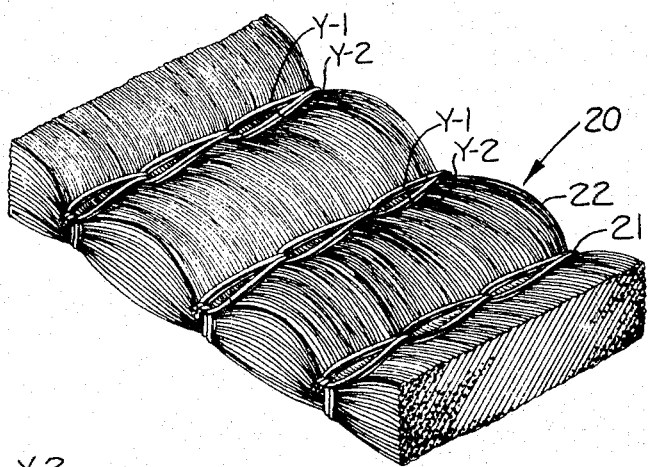
FIGURE 3 is an enlarged fragmentary view of a small portion of the obverse side of the stitched non-woven fibrous batt and illustrating the appearance of the same before the uncompressed fibers of the raised ribs are opened up.
Figure 4:
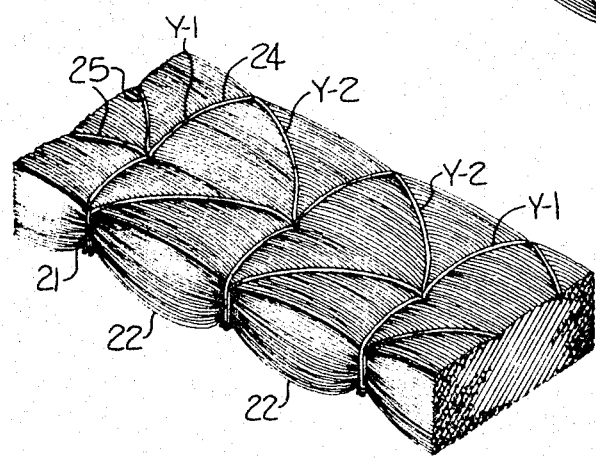
FIGURE 4 is a fragmentary view of the reverse side of the fabric shown in FIGURE 3 and illustrating the manner in which one yarn forms straight line stitch portions while the other yarn forms diagonally extending cross-linking stitch portions.

As viewed from the obverse side in FIGURE 3, this stitched non-woven batt 20 comprises a series of spaced longitudinal depressed areas or valleys 21 and a series of parallel uncompressed fibers forming raised parallel ribs 22. The reverse side of the stitched non-woven batt, shown in FIGURE 4, is substantially flat, that is, it does not include the parallel ribs seen on the obverse side of the batt in FIGURE 3.

Parallel rows of chain stitches are formed along each of the valleys 21 (FIGURE 3) and compress the fibers of the non-woven batt in these areas. The stitch loops along each chain are successively connected and each stitch loop is formed of two yarns, indicated at Y-1 and Y-2.

The reverse side of the fabric 10 and of the batt 20 (FIGURES 2 and 4) has a geometric pattern of stitch loop portions including straight line stitch portions 24 which are formed of the first yarn Y-1 and extend parallel to the chain stitches and valleys 21 on the obverse side of the batt 20. The reverse side also includes diagonally extending stitch portions 25 which are formed of the yarn Y-2 and interconnect the parallel rows of chain stitches on the obverse side.

The non-woven fibrous batt 20 may be formed of a plurality of carded laps in which the individual fibers are substantially parallelized and extend generally in one direction. The individual fibers preferably extend transversely or widthwise of the non-woven batt and may be laid in this direction by cross-lapping. The non-woven batt is then passed longitudinally through the stitching machine so that the parallel rows of chain stitches extend longitudinally or lengthwise of the batt and cross-wise or transverse to the direction of the fibers so as to provide maximum strength in the finished product. If desired, a batt of randomly disposed fibers may be used instead of built-up carded laps.

The non-woven batt or base 20 may be formed of natural or synthetic fibers or blends of mixtures of the same and the fibers may be in the form of filaments or staple fibers of various lengths. A commercially advantageous form of material, from a cost and availability standpoint, is viscose rayon. Other examples of suitable fibers are cotton, polyamides, polyester and acrylic fibers or blends. The yarns Y-1 and Y-2 which are used for stitching the fibrous batt 20 may be of various natural or synthetic fibers or blends but continuous filament synthetic yarns are advantageous to obtain relatively high strength and to prevent breakage in the manufacturing operation and to also give good tensile strength to the finished fabric. A commercially advantageous form of yarn for this purpose is filament nylon yarn of approximately 100–150 denier.

A suitable type of machine for stitching the non-woven fibrous batt 20 is illustrated in FIGURES 6–14. This machine forms no part of the present invention and is not being claimed herein. As shown in FIGURE 7, the non-woven fibrous batt 20 is carried along a horizontal conveyor apron 30 as it enters the stitching machine. The batt W is then carried upwardly at an angle on a conveyor apron 31 which is suitably supported and driven to deliver the batt to the stitching mechanism broadly indicated at 32 in FIGURE 7. As the stitches are formed through the non-woven batt 20, it passes between a knock-over comb 34 and a web holder bar 35 (FIGURE 12). After the stitches are formed in the batt, in a manner to be presently described, the stitched non-woven batt 20 passes between trimming edge cutters 37, positioned at opposite edges of the fabric, only one of which is shown in FIGURE 12. The stitched batt then passes over driven take-up rolls 40 and around an idler roll 41. The batt then is withdrawn from the machine and passes between driven take-up rolls 42 which feed the stitched batt to a wind-up or take-up apparatus, now shown.

As best shown in FIGURES 13 and 14, hooked needles N are embedded at their rear ends in molded needle bar segments 44. The forward ends of latch elements L extend through the needles N and their rear ends are embedded in molded latch bar segments 45. A cam shaft housing 50 (FIGURE 12) is suitably supported at opposite ends on opposite side frames 51, 52 (FIGURE 6). A main drive cam shaft 54 (FIGURE 12) is rotated from the drive mechanism of the machine to impart rotation to eccentrics, such as indicated at 55 in FIGURE 12, to impart movement to suitable control linkage and control the operation of the needles N, the latch elements L, the web holder bar 35, and sets of respective upper and lower yarn guides G-1 and G-2, in a manner to presently be described.

As shown in FIGURE 12, levers 59 and links 60, 61 control the movement of the latches L and needles N so that the free ends of the latches L moves into position to close the hooks of the needles N after they have penetrated the non-woven web W.

The outer ends of the upper yarn guides G-1 (FIGURE 10) are embedded in molded yarn guide support segments which are in turn fixed on an upper guide bar 62. At spaced intervals along the guide bar 62, the inner ends of support brackets 63 are suitably secured thereto and their outer legs support opposed ends of slide plates 64. Medial portions of the slide plates 64 are suitably supported in a support bracket 65 which has means in the form of an adjustment screw 66 (FIGURE 8) for adjusting the position of the yarn guides G-1, relative to the needles N. The bracket 65 is fixed on a yarn guide control shaft 67, opposite ends of which are suitably supported in the end frames 51, 52. Oscillation is imparted to the guide control shaft 67 by means of a lever 68 (FIGURE 12) which has the forward end of a link 70 connected thereto. The opposite end of the link 70 is connected to a suitable lever 71 (FIGURE 12) to which movement is imparted by means of the eccentric 55 and the rotating main cam shaft 54, in the same manner as movement is imparted to the lever 59.

As shown in FIGURE 11, the outer ends of the lower yarn guides G–2 are embedded in groups in molded guide support segments which are in turn secured on a lower guide bar 72. At spaced intervals along the guide bar 72, the inner ends of support brackets 73 are fixed thereto. Guide plates 74 are suitably connected at opposite ends to the legs of the brackets 73 and supported for sliding movement intermediate their ends on a bracket 75, which is fixed on the guide shaft 67. An adjustment screw 76 (FIGURE 11) is provided for adjusting the position of the yarn guides G–2, relative to the needles N. As oscillation is imparted to the guide control shaft 67, the upper and lower yarn guides G–1 and G–2 are caused to be shifted radially of the shaft 67 and are thereby raised and lowered, relative to the hooks of the needles N.

In FIGURES 10 and 11, means is disclosed for imparting longitudinal movement to the guide bars 62, 72 and for thereby shogging the yarn guides G–1 and G–2 in a direction transversely of the needles N so that the corresponding yarns Y–1 and Y–2 may be fed to selected needles. The yarn guide shogging means includes constantly rotating drive shaft 80 which is rotatably supported in a housing 81 that is fixed to the outer surface of the side frame 51. The housing 81 preferably contains a supply of lubricant to maintain the parts therein in constant lubrication.

A pair of control cams 82, 83 are replaceably secured to the rotating shaft 80 and their motion is transmitted to the respective guide bars 62, 72, by any suitable linkage. In the present instance, rollers 84, 85 engage the respective cams 82, 83 and are connected to one end of operating links 86, 87 which are suitably secured at their other ends to the respective guide bars 62, 72. Suitable springs 90, 91 are provided to maintain the rollers 84, 85 in engagement with the cams 82, 83. Thus, the cams 82, 83 control the transverse movement of the guides G–1 and G–2, relative to the needle N, and different cams may be used so that chain stitches may be formed by either or both of the yarn guides G–1 and G–2, either or both of the yarn guides G–1 and G–2 can be moved between the needles in a zig-zag movement, or one set of guides can form a chain stitch on the same needles while the other set of yarn guides is shogged.

As has been pointed out in connection with the stitched non-woven batt, shown in FIGURES 3 and 4, both the yarns Y–1 and Y–2 are fed to the hooks of the needles N with each penetration of the needles N through the non-woven batt. As shown in FIGURES 13 and 14, the yarns Y–1 fed by the yarn guides G–1 are always fed to the same needles and therefore require very little shogging movement by the cam 82 (FIGURE 10) while the guides G–2 are shogged one needle's distance to form the diagonally extending cross-over stitch portions 25 (FIGURE 4). Therefore, the cam 83 (FIGURE 11) must have a greater throw than the cam 82 so as to impart sufficient transverse movement to the yarn guides G–2 (FIGURE 14). Thus, the yarns Y–1 are fed to the hooks of the same needles N after each penetration of the non-woven batt while the yarns Y–2 are fed to the hooks of certain needles after a given penetration of the non-woven batt and then they are fed to the hooks of adjacent needles after the next penetration. It is to be understood that both of the yarns Y–1 and Y–2 are stitched together to form the double yarn chain stitches in the valleys 21 on the obverse face of the batt 20 (the side opposite that shown in FIGURES 13 and 14), as shown in FIGURE 1.

As shown in FIGURE 7, the yarns Y–1 and Y–2 are supplied from respective warp beams 94, 95 and are directed upwardly therefrom and over suitable combs 96 and tension rods 97 (FIGURE 12). Suitable drive means, not shown, is provided in the gear compartment adjacent the end frame 52 for permitting the warp beams 94, 95 to let-off at the desired speed so that the yarns Y–1 and Y–2 will be fed to the yarn guides at the proper rate.

Figure 5:
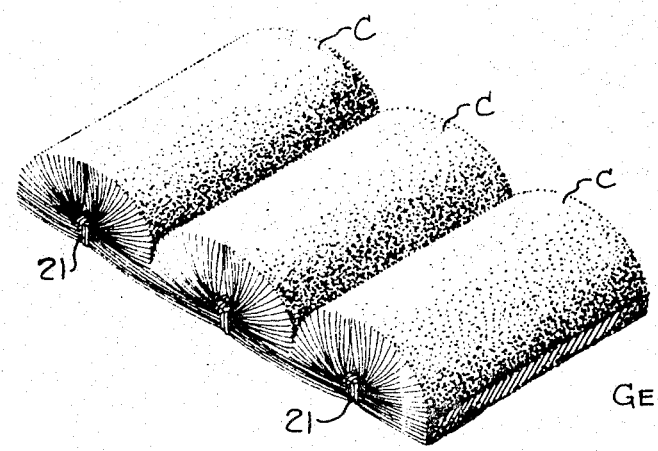
FIGURE 5 is a fragmentary view of the obverse side of the simulated non-woven corduroy fabric, after the fibers have been processed as above described, including cutting, brushing and shearing to produce the soft surface effect simulating that of conventional woven corduroy fabric.

The stitched non-woven batt, shown in FIGURES 3 and 4, is further processed to open up the uncompressed fibers of the ribs 22 or to produce the soft surface effect or ribs, generally indicated at C in FIGURES 1 and 5, simulating that of conventional woven corduroy fabric.

This processing, as illustrated in FIGURE 15, may include cutting, brushing and shearing of the stitched batt 20. As illustrated therein, the stitched non-woven batt is led from the stitching machine, shown in FIGURES 6–14, through a cutting mechanism generally indicated at 100. This cutting mechanism is illustrated as an "antique cylinder" of a fine gauge adapted to rotate in the direction of travel of the stitched batt 20. The cutting mechanism 100 includes a plurality of hook-shaped cutting blades 101 spaced apart from each other a distance equal to the spacing of the ribs 22 in the stitched batt 20. As the cutting mechanism rotates, the blades 101 will engage the fibers in the ribs 22 bringing them on the inside cutting surface thereof to be cut and opened up. It is noted that the speed of rotation of the cutting mechanism 100 is much greater than the speed of travel of the stitched batt 20 to insure the opening up and cutting of substantially all of the surface fibers in the ribs 22.

Following cutting and opening up of the fibers in the ribs 22, the fabric is led forward through a brushing or napping mechanism, generally indicated at 105. This mechanism may be any conventional brushing or napping device and operates to lightly brush the cut fibers in the ribs 22 to cause the cut fibers to assume a more or less erect position.

Lastly, the fabric is led through a shearing apparatus, generally indicated at 110. This apparatus may be of the type produced by Parks & Woolson Machine Co., of Springfield, Vermont, and known in the textile trade as a "Merrimack Shear." The apparatus includes curved shearing blades adapted to shear off the uneven, upstanding cut fibers in the ribs 22 without flattening the ribs to produce the even, soft surface effect or ribs C in the simulated non-woven corduroy fabric 10.

The above-mentioned sequential processing steps of cutting, brushing and shearing the stitched non-woven batt cofunction to give the desired soft, raised corduroy effect simulating that of conventional woven corduroy.

In the drawings and specification there has been set forth a preferred embodiment of the invention and, although specific terms are employed, they are used in a descriptive sense only and not for purposes of limitation, the scope of the invention being defined in the claims.

I claim:
1. A non-woven simulated corduroy fabric comprising:
(a) a self-sustaining batt of non-woven fibers extending generally in the widthwise direction of said fabric to provide strength and stability to said fabric in the widthwise direction;
(b) a plurality of stitches penetrating said batt and holding said non-woven fibers together, said stitches being arranged in closely spaced apart, parallel rows on the obverse side of said batt and extending in generally the lengthwise direction of said fabric for providing strength and stability to said fabric in the lengthwise direction, each of said rows of stitches comprising chain stitch portions utilizing two yarn ends in each stitch and compressing said batt along said rows to form corresponding parallel depressed areas therealong, the portions of said batt between said rows of stitches being substantially uncompressed and defining spaced, parallel ribs, said stitches being arranged in interconnected diagonally extending and straight line portions on the reverse side of said batt for providing a non-corded effect and for providing strength and stability to said fabric in both the lengthwise and widthwise directions, said diagonally extending stitch portions being formed by one of said two yarns utilized for said chain stitch portions and said straight line stitch portions being formed by the other of said two yarns utilized for said chain stitch portions; and (c) each said rib being cut partially through the thickness of said batt intermediate said rows of stitches on said obverse side of the fabric forming rows of upstanding cut ends of fibers to provide a surface on said fabric having the appearance and feel simulating that of conventional woven corduroy fabric.

2. A non-woven simulated corduroy fabric, as set forth in claim 1, in which said upstanding, cut end fibers of said ribs are parallel cylindrical convexities with simulated corduroy characteristics.

References Cited

UNITED STATES PATENTS

| 321,154 | 6/1885 | Stowe | 112—412 |
|---|---|---|---|
| 1,471,029 | 10/1923 | Hooper | 66—193 |
| 1,860,090 | 5/1932 | Fowler | 112—412 |
| 1,961,139 | 6/1934 | Elder | 161—50 |
| 2,121,285 | 6/1938 | Cone | 161—50 |
| 2,155,212 | 4/1939 | Zenorini | 112—411 |
| 2,695,438 | 11/1954 | Bejeuhr | 28—15 |
| 2,890,579 | 6/1959 | Mauersberger | 66—192 |
| 3,168,883 | 2/1965 | Ploch et al. | 112—411 |

FOREIGN PATENTS 695,120   9/1965   Canada.

OTHER REFERENCES

"AATT" Publication, Papers of the American Assn. for Textile Tech., Inc., November 1965, paper presented on Sept. 8, 1965, to meeting of American Assn. for Textile Tech., Inc., in New York City, by K. W. Bahlo.

HERBERT F. ROSS, *Primary Examiner.*